US 6,530,396 B1

(12) United States Patent
Frey

(10) Patent No.: US 6,530,396 B1
(45) Date of Patent: Mar. 11, 2003

(54) VALVE COUPLER FOR DELIVERING AIR INTO A PROPANE TANK

(76) Inventor: Donald D. Frey, 1150 SE. 15th Ave., Hillsboro, OR (US) 97123

( * ) Notice: Subject to any disclaimer, the term of this patent is extended or adjusted under 35 U.S.C. 154(b) by 0 days.

(21) Appl. No.: 09/853,480

(22) Filed: May 11, 2001

(51) Int. Cl.[7] .............................................. F16K 37/00
(52) U.S. Cl. ........................ 137/557; 137/602; 137/605
(58) Field of Search ................................. 137/557, 377, 137/602, 605

(56) References Cited

U.S. PATENT DOCUMENTS

| 3,517,693 A | * | 6/1970 | Dietz ........................... 137/557 |
| 3,554,225 A | | 1/1971 | Debenedetto |
| 3,561,467 A | | 2/1971 | Lutz |
| 3,854,497 A | * | 12/1974 | Rosenberg .................... 137/557 |
| 4,327,589 A | * | 5/1982 | Forster ..................... 137/557 X |
| 4,901,761 A | * | 2/1990 | Taylor ......................... 137/557 |
| 5,119,844 A | | 6/1992 | Cannon et al. |
| 5,218,995 A | * | 6/1993 | Lee ............................. 137/557 |
| D348,507 S | | 7/1994 | Plonka |
| 5,404,905 A | * | 4/1995 | Lauria ........................ 137/557 |
| 5,924,747 A | | 7/1999 | Miyashita |
| 5,992,438 A | | 11/1999 | Shaw |
| 6,167,900 B1 | * | 1/2001 | Laird .......................... 137/227 |

* cited by examiner

Primary Examiner—John Rivell

(57) ABSTRACT

A valve coupler for delivering air into a propane tank for converting a propane tank to a portable pressurized air tank. The device includes a tubular member having a first end, a second end and a peripheral wall. The tubular member has an elongated hole extending therethrough. The tubular member has a first portion, a second portion and a middle portion. The first portion abuts the first end and defines a male coupler having a threaded outer surface. The hole in the second portion has a threaded inner wall and defines a female coupler. The peripheral wall of the middle portion has a first aperture therein extending into the hole. The first aperture is threaded. The male coupler may be coupled to a propane tank valve. A valve is removably positioned in and threadably coupled to the first aperture for delivering air into the propane tank.

2 Claims, 4 Drawing Sheets

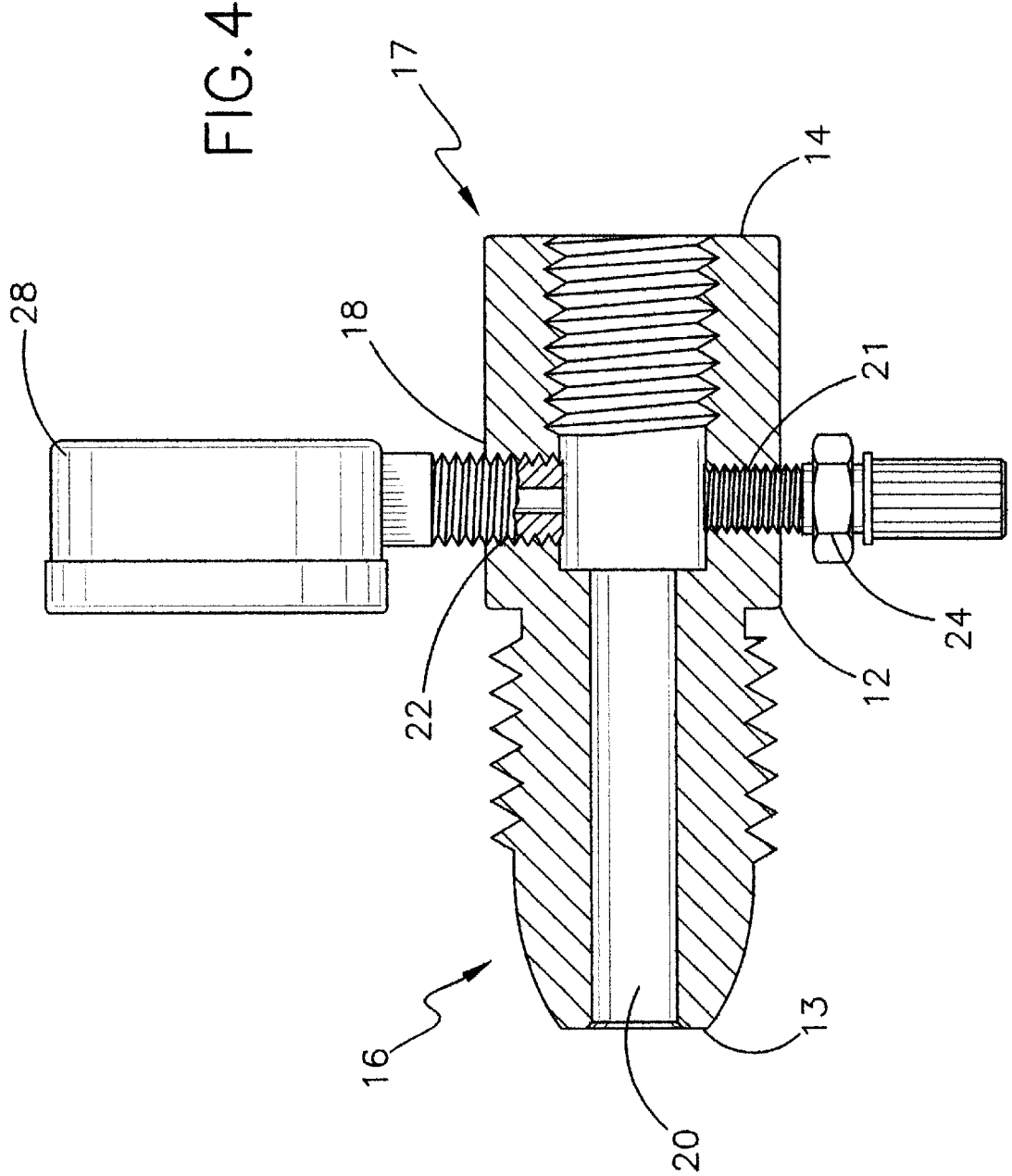

VALVE COUPLER FOR DELIVERING AIR INTO A PROPANE TANK

BACKGROUND OF THE INVENTION

1. Field of the Invention

The present invention relates to valve devices and more particularly pertains to a new valve coupler for delivering air into a propane tank for converting a propane tank to a portable pressurized air tank.

2. Description of the Prior Art

The use of valve devices is known in the prior art. More specifically, valve devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,119,844; U.S. Pat. No. 5,992,438; U.S. Pat. No. 3,554,225; U.S. Pat. No. 5,924,747; U.S. Pat. No. 3,561,467; and Des. U.S. Pat. No. 348,507.

While these devices fulfill their respective, particular objectives and requirements, the aforementioned patents do not disclose a new valve coupler for delivering air into a propane tank. The inventive device includes a tubular member having a first end, a second end and a peripheral wall extending between the first and second ends. The tubular member has an elongated hole extending through the first and second ends. The tubular member has a first portion, a second portion and a middle portion between the first and second portions. The first portion abuts the first end and defines a male coupler having a threaded outer surface. The hole in the second portion has a threaded inner wall and defines a female A coupler. The peripheral wall of the middle portion has a first aperture therein extending into the hole. The first aperture is threaded. The male coupler may be coupled to a propane tank valve. A valve is removably positioned in and threadably coupled to the first aperture for delivering air into the propane tank.

In these respects, the valve coupler for delivering air into a propane tank according to the present invention substantially departs from the conventional concepts and designs of the prior art, and in so doing provides an apparatus primarily developed for the purpose of converting a propane tank to a portable pressurized air tank.

SUMMARY OF THE INVENTION

In view of the foregoing disadvantages inherent in the known types of valve devices now present in the prior art, the present invention provides a new valve coupler for delivering air into a propane tank construction wherein the same can be utilized for converting a propane tank to a portable pressurized air tank.

The general purpose of the present invention, which will be described subsequently in greater detail, is to provide a new valve coupler for delivering air into a propane tank apparatus and method which has many of the advantages of the valve devices mentioned heretofore and many novel features that result in a new valve coupler for delivering air into a propane tank which is not anticipated, rendered obvious, suggested, or even implied by any of the prior art valve devices, either alone or in any combination thereof.

To attain this, the present invention generally comprises a tubular member having a first end, a second end and a peripheral wall extending between the first and second ends. The tubular member has an elongated hole extending through the first and second ends. The tubular member has a first portion, a second portion and a middle portion between the first and second portions. The first portion abuts the first end and defines a male coupler having a threaded outer surface. The hole in the second portion has a threaded inner wall and defines a female coupler. The peripheral wall of the middle portion has a first aperture therein extending into the hole. The first aperture is threaded. The male coupler may be coupled to a propane tank valve. A valve is removably positioned in and threadably coupled to the first aperture for delivering air into the propane tank.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new valve coupler for delivering air into a propane tank apparatus and method which has many of the advantages of the valve devices mentioned heretofore and many novel features that result in a new valve coupler for delivering air into a propane tank which is not anticipated, rendered obvious, suggested, or even implied by any of the prior art valve devices, either alone or in any combination thereof.

It is another object of the present invention to provide a new valve coupler for delivering air into a propane tank which may be easily and efficiently manufactured and marketed.

It is a further object of the present invention to provide a new valve coupler for delivering air into a propane tank which is of a durable and reliable construction.

An even further object of the present invention is to provide a new valve coupler for delivering air into a propane tank which is susceptible of a low cost of manufacture with regard to both materials and labor, and which accordingly is then susceptible of low prices of sale to the consuming public, thereby making such valve coupler for delivering air into a propane tank economically available to the buying public.

Still yet another object of the present invention is to provide a new valve coupler for delivering air into a propane tank which provides in the apparatuses and methods of the prior art some of the advantages thereof, while simultaneously overcoming some of the disadvantages normally associated therewith.

Still another object of the present invention is to provide a new valve coupler for delivering air into a propane tank for converting a propane tank to a portable pressurized air tank.

Yet another object of the present invention is to provide a new valve coupler for delivering air into a propane tank which includes a tubular member having a first end, a second end and a peripheral wall extending between the first and second ends. The tubular member has an elongated hole extending through the first and second ends. The tubular member has a first portion, a second portion and a middle portion between the first and second portions. The first portion abuts the first end and defines a male coupler having a threaded outer surface. The hole in the second portion has a threaded inner wall and defines a female coupler. The peripheral wall of the middle portion has a first aperture therein extending into the hole. The first aperture is threaded. The male coupler may be coupled to a propane tank valve. A valve is removably positioned in and threadably coupled to the first aperture for delivering air into the propane tank.

Still yet another object of the present invention is to provide a new valve coupler for delivering air into a propane tank that allows a person to use a propane tank for other purposes once it is not useful for holding propane.

These together with other objects of the invention, along with the various features of novelty which characterize the invention, are pointed out with particularity in the claims annexed to and forming a part of this disclosure. For a better understanding of the invention, its operating advantages and the specific objects' attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic cross-sectional view of the first embodiment of the present invention.

DESCRIPTION OF THE PREFERRED EMBODIMENT

Figure 1:
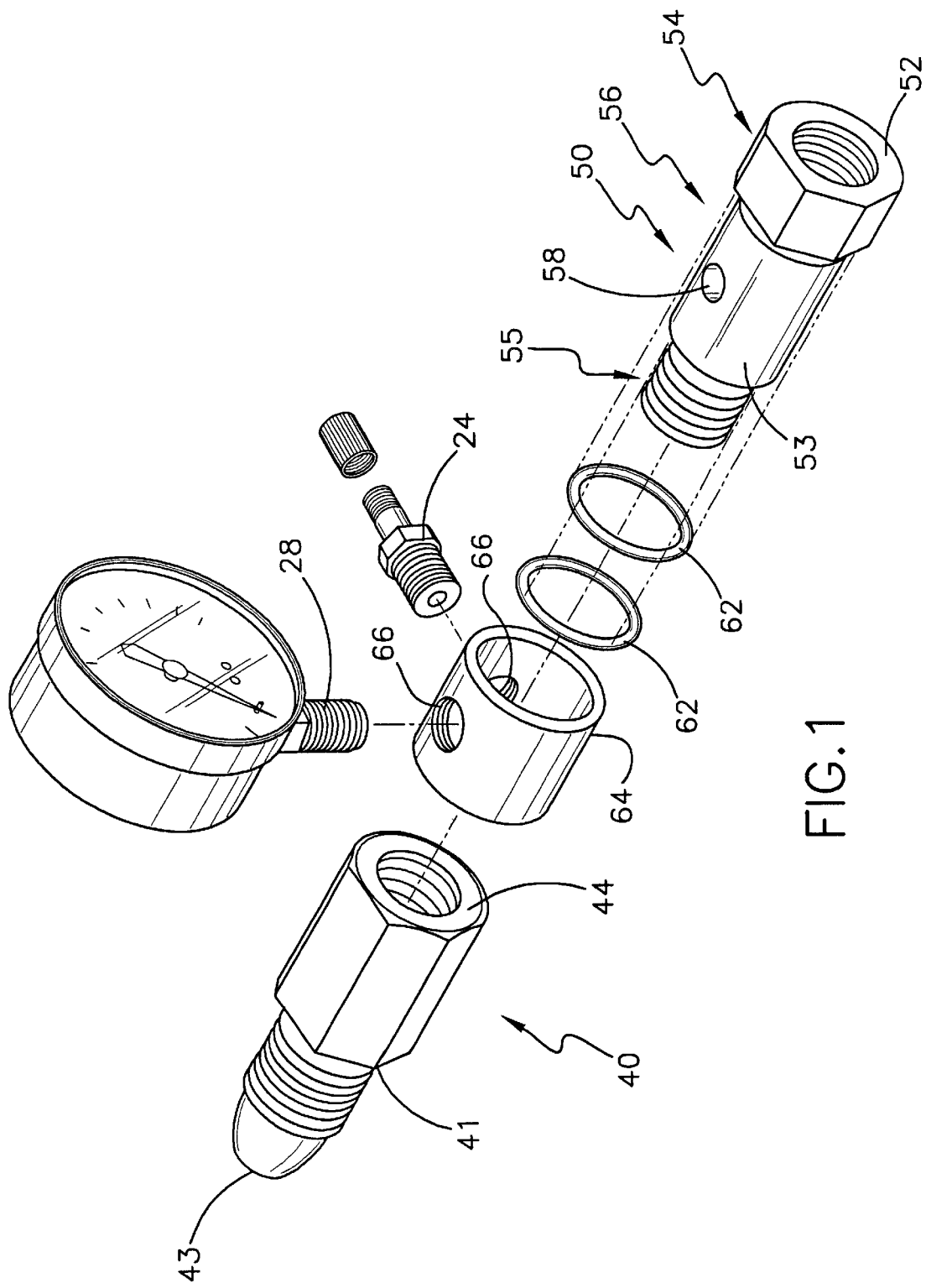
FIG. 1 is a schematic perspective view of a second embodiment of a new valve coupler for delivering air into a propane tank according to the present invention.
Figure 2:
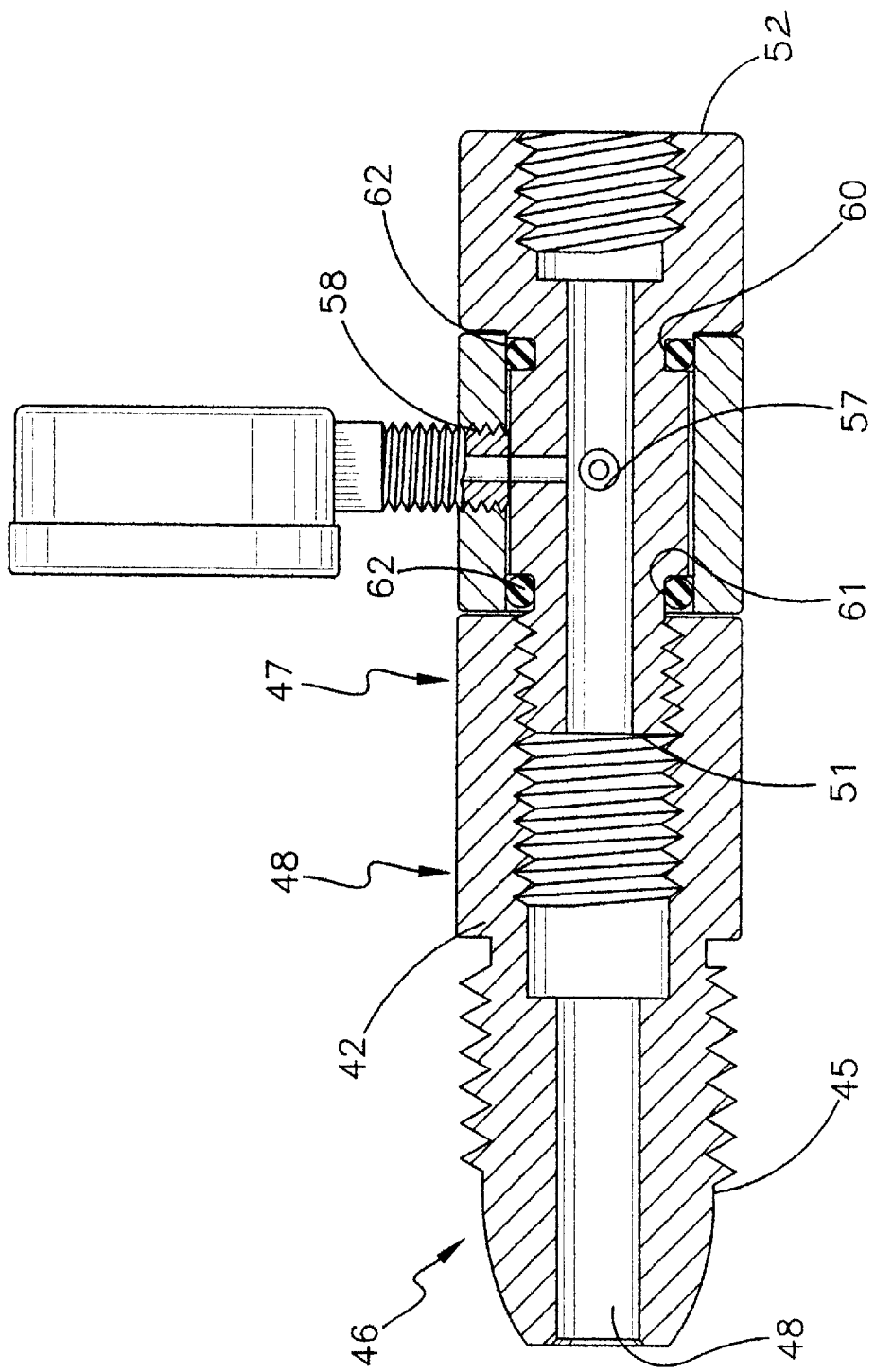
FIG. 2 is a schematic cross-sectional view of the second embodiment of the present invention.

With reference now to the drawings, and in particular to FIGS. 1 through 4 thereof, a new valve coupler for delivering air into a propane tank embodying the principles and concepts of the present invention and generally designated by the reference numeral 10 will be described.

Figure 3:
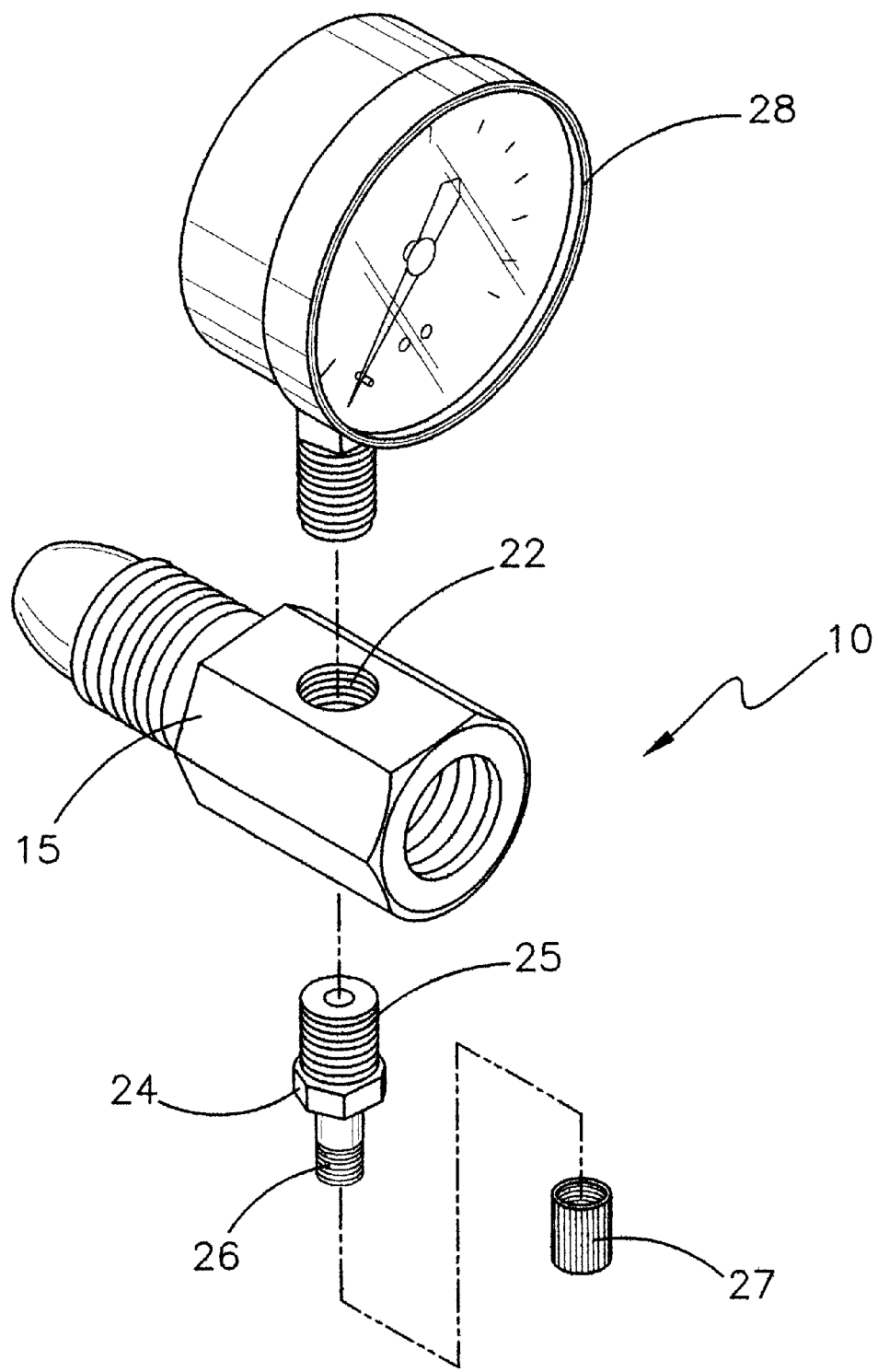
FIG. 3 is a schematic perspective view of the first embodiment of the present invention.

As best illustrated in FIGS. 3 and 4, the valve coupler 10 for delivering air into a propane tank generally comprises a device for converting a conventional propane tank into a pressurized air containing tank. The device 10 comprises tubular member 12 having a first end 13, a second end 14 and a peripheral wall 15 extending between the first 13 and second 14 ends. The tubular member 12 has an elongated hole 20 extending therethrough and the first 13 and second 14 ends. The tubular member 12 has a first portion 16, a second portion 17 and a middle portion 18 between the first 16 and second 17 portions. The first portion 16 abuts the first end 13 and defines a male coupler having a threaded outer surface. The hole 20 in the second portion 17 has a threaded inner wall and defines a female coupler. The peripheral wall 15 of the middle portion 18 has a first aperture 21 therein extending into the hole 20. The peripheral wall 15 of the middle portion 18 has a second aperture 22 therein extending into the hole 20 and is preferably positioned generally opposite and axially aligned with respect to the first aperture 21. Each of the first 21 and second 22 apertures is threaded. The male coupler may be coupled to a conventional the propane tank.

A valve 24 is removably positioned in and threadably coupled to the first aperture 12. The valve 24 has a first threaded end 25 removably extendable into the first aperture 21 and threadably coupled to the first aperture 21. The valve 24 has a second threaded end 26, wherein the second threaded end may be coupled to an air pump. A cap 27 may be positioned over and threadably coupled to the valve 24. The valve 24 is ideally a conventional tire valve stem type device. Ideally, a conventional air pressure gauge 28 is threadably engaged to the second bore.

A second embodiment 40 comprises a retrofitted propane tank valve coupler conversion device for converting a propane tank to a pressurized air tank. The tank valve coupler 41 is a conventional one comprising a tubular member 42 having a first end 43, a second end 44 and a peripheral wall 45 extending between the first 43 and second 44 ends. The tubular member 42 has an elongated hole 48 extending therethrough and the first 43 and second 44 ends. The tubular member 42 has a first portion 46, a second portion 47 and a middle portion 48 between the first 46 and second 47 portions. The first portion 46 abuts the first end 43 and defines a male coupler having a threaded outer surface. The hole 48 in the second portion 47 has a threaded inner wall and defines a female coupler.

The second embodiment 40 includes a cylinder 50 having a first open end 51, a second open end 52 and a perimeter wall 53 extending therebetween. The cylinder 50 has distal portion 54, a proximal portion 55 and a middle section 56 positioned between the distal 54 and proximal 55 portions. The distal portion 54 has an inner threaded surface. The proximal portion 55 has an outer threaded surface. The proximal portion 55 is extendable into and threadably joinable to the female coupler of the tank valve coupler 41. The middle section 56 of the perimeter wall 53 has a first opening 57 extending therethrough. The first opening 57 is threaded. The middle section 56 of the perimeter wall 53 has a second opening 58 extending therethrough. The second opening 58 is threaded. The distal portion 54 has an outer diameter greater than an outer diameter of the middle section 56. A pair of channels extends around the cylinder 50. A first 60 of the channels is positioned between the distal portion 54 and the middle section 56. A second 61 of the channels is positioned between the proximal portion 55 and the middle section 56.

Each of a pair of seals 62 is positionable in one of the channels 60, 61. The seals 62 are conventional elastomeric seals.

A covering 64 is positionable over the middle section 56 and abuts the seals 62. The covering 64 has a pair of openings 66 therein. Each of openings 66 in the covering 64 is alignable with one of the apertures 57, 58 in the cylinder 50.

The valve 24 is removably positioned in and threadably coupled to the first opening 57. The air pressure gauge 28 is threadably engaged to the second bore 58.

In use, the device is used for pumping air into a propane tank so that the propane tank may be used for holding portable pressurized air.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts 6f the invention, to include variations in size, materials, shape, form, function and manner of operation, assembly and use, are deemed readily apparent and obvious to one skilled in the art, and.all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coupler device for coupling to a propane tank valve and converting the propane tank into a pressurized air containing tank, said device comprising:

a tubular member having a first end, a second end and a peripheral wall extending between said first and second ends, said tubular member having an elongated hole extending therethrough and said first and second ends, said tubular member having a first portion, a second portion and a middle portion between said first and second portions, said first portion abutting said first end and defining a male coupler, said first portion comprising an exterior portion and an interior portion, said interior portion of said first portion having threaded outer surface, said exterior portion of said first portion being positioned between said first end of said tubular members and said interior portion, said exterior portion comprising a smooth outer surface and tapering from said interior portion to said first end of said tubular member such that said exterior portion is adapted for facilitating alignment of said first portion with a supply conduit of the propane tank, said hole in said second portion having a threaded inner wall and defining a female coupler, said peripheral wall of said middle portion having a first aperture therein extending into said hole, said peripheral wall of said middle portion having a second aperture therein extending into said hole, said first aperture having an axis intersecting an axis of said second aperture, said axis of said first aperture and said axis of said second aperture being oriented substantially perpendicular to each other, each of said first and second apertures being threaded, wherein said male coupler may be coupled to the propane tank;

a valve being removably positioned in and threadably coupled to said first aperture, said valve having a first threaded end removably extendable into said first aperture and threadably coupled to said first aperture, said valve having a second threaded end, wherein said second threaded end may be coupled to an air pump; and an air pressure gauge being threadably engaged to said second aperture.

2. A propane tank valve coupler conversion device for converting a propane tank to a pressurized air tank, the tank valve coupler comprising a tubular member having a first end, a second end and a peripheral wall extending between said first and second ends, said tubular member having an elongated hole extending therethrough and said first and second ends, said tubular member having a first portion, a second portion and a middle portion between said first and second portions, said first portion abutting said first end and defining a male coupler and having a threaded outer surface, said hole in said second portion having a threaded inner wall and defining a female coupler, said device comprising:

a cylinder having a first open end, a second open end and a perimeter wall extending therebetween, said cylinder having a distal portion, a proximal portion and a middle section positioned between said distal and proximal portions, said distal portion having an inner threaded surface, said proximal portion having an outer threaded surface, said proximal portion being extendable into and threadably joinable to said female coupler of said tank valve coupler, said middle section of said perimeter wall having a first opening extending therethrough, said first opening being threaded, said middle section of said perimeter wall having a second opening extending therethrough, said second opening being threaded;

a valve being removably positioned in and threadably coupled to said first opening, said valve having a first threaded end removably extendable into said first aperture and threadably coupled to said first aperture, said valve having a second threaded end, wherein said second threaded end may be coupled to an air pump;

an air pressure gauge being threadably engaged to said second aperture;

said distal portion having an outer diameter greater than an outer diameter of said middle section;

a pair of channels extending around said cylinder, a first of said channels being positioned between said distal portion and said middle section, a second of said channels being positioned between said proximal portion and said middle section;

a pair of seals, each of said seals being positionable in one of said channels; and a covering being positionable over said middle section and abutting said seals, said covering having a pair of openings therein, each of openings in said covering being alignable with one of said apertures in said cylinder.

* * * * *